United States Patent [19]

Schell

[11] Patent Number: 5,169,702

[45] Date of Patent: Dec. 8, 1992

[54] REFLECTIVE WRAP AND METHOD OF MANUFACTURE

[76] Inventor: Nancy Schell, R.D. #1, Box 48, Germansville, Pa. 18053

[21] Appl. No.: 747,842

[22] Filed: Aug. 20, 1991

[51] Int. Cl.⁵ .................. B32B 3/16; B32B 23/02; B68B 5/06; F22B 9/12
[52] U.S. Cl. ........................ 428/102; 428/78; 428/81; 428/122; 428/126; 428/193; 428/230; 54/76; 119/106; 359/516; 359/518
[58] Field of Search ............ 428/78, 81, 102, 122, 428/126, 193, 224, 230; 54/76; 119/106; 359/516, 518

[56] References Cited

U.S. PATENT DOCUMENTS

| | | | |
|---|---|---|---|
| 3,871,336 | 3/1975 | Bergman | 119/106 |
| 4,091,766 | 7/1978 | Colliard | 119/106 |
| 4,377,988 | 3/1983 | Zung et al. | 119/106 |
| 5,050,538 | 9/1991 | Gurski, Jr. | 119/106 |

Primary Examiner—George F. Lesmes
Assistant Examiner—Kathryne E. Shelborne
Attorney, Agent, or Firm—John J. Selko

[57] ABSTRACT

A reflective safety wrap for use on appendages of joggers or horses includes an elongated elastic fabric strip with a reflective material superimposed thereon. A blind stitch joins the elastic fabric and reflective material. Fastening devices are positioned at each end of the wrap. The method for making the blind stitch is disclosed.

5 Claims, 2 Drawing Sheets

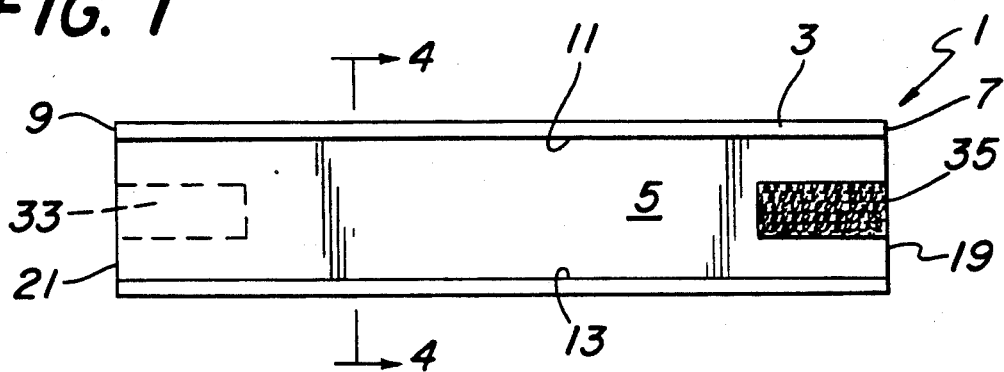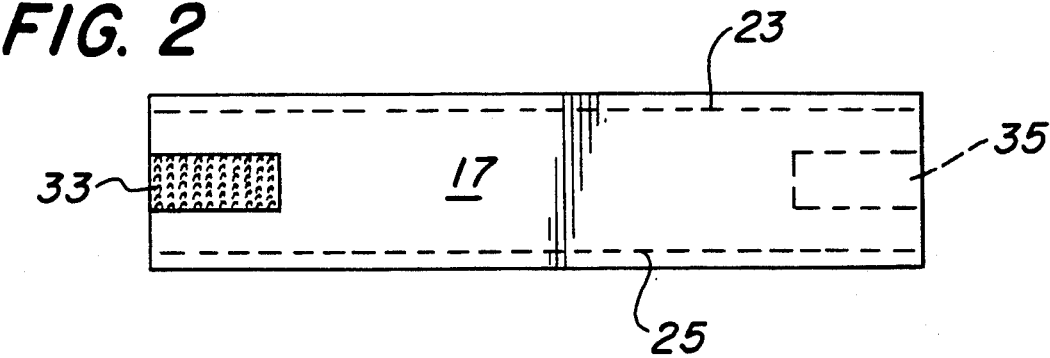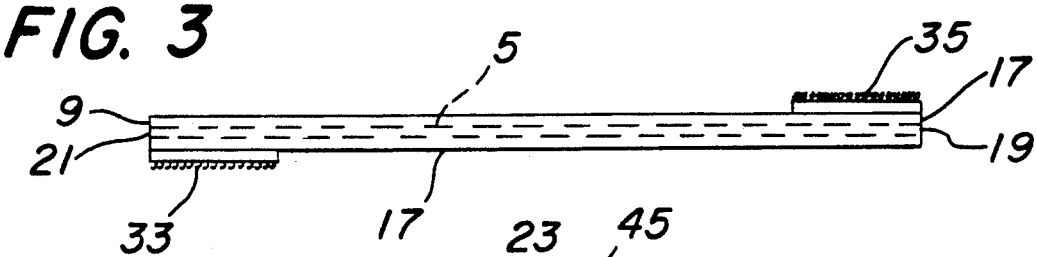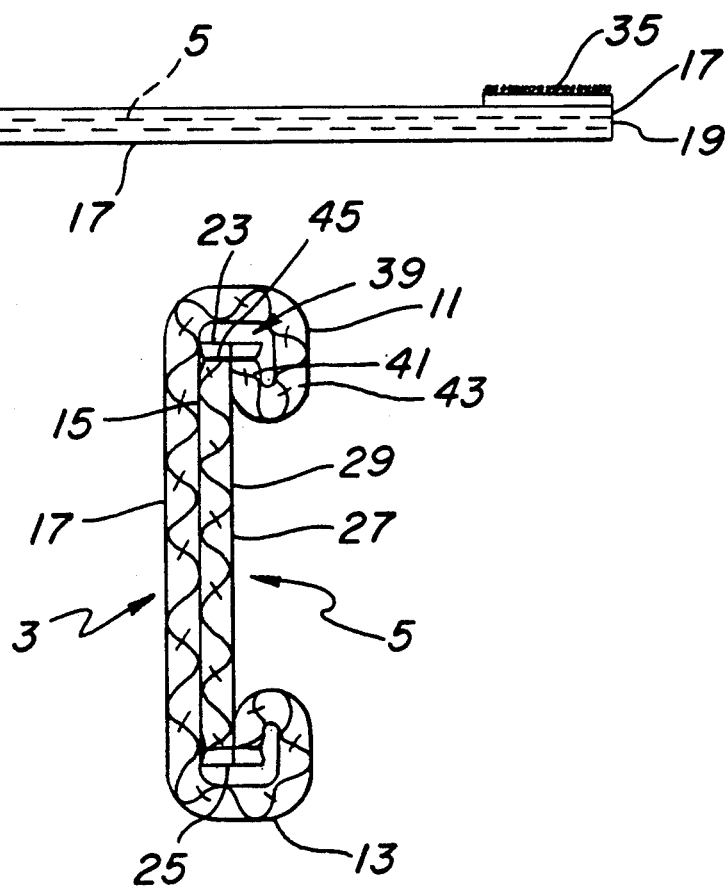

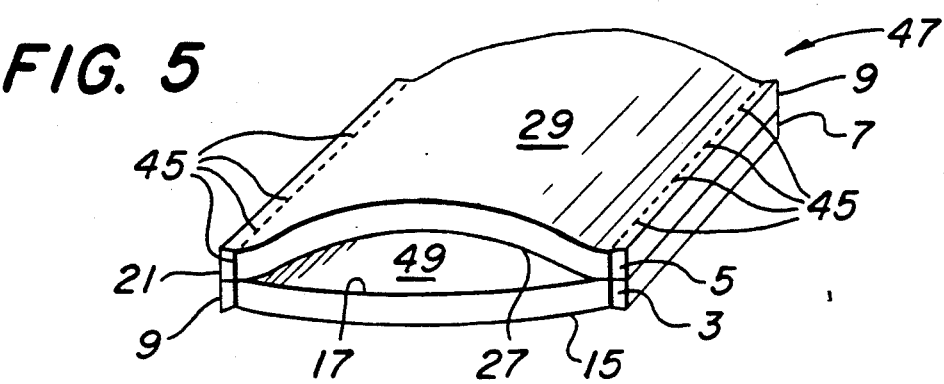
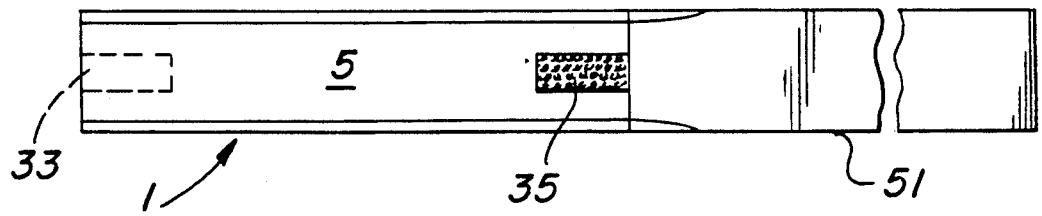
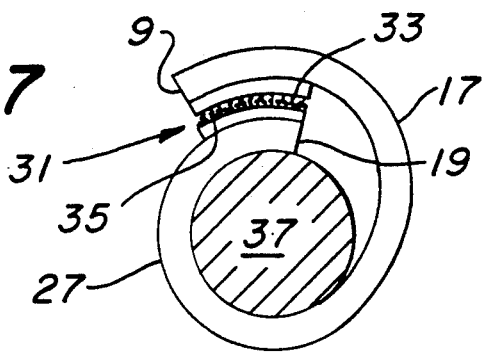
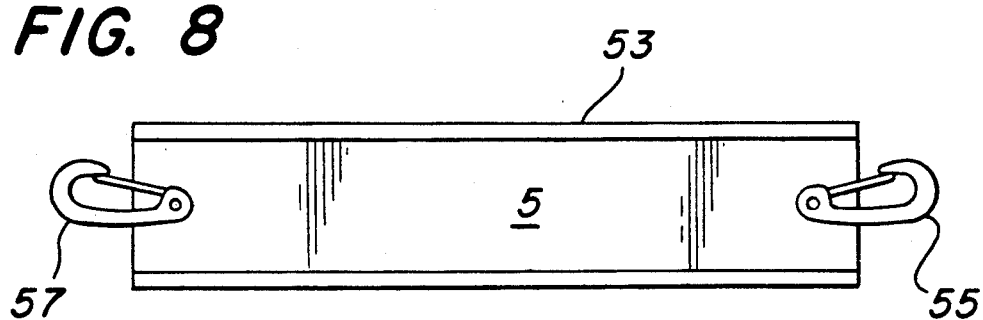

REFLECTIVE WRAP AND METHOD OF MANUFACTURE

FIELD OF THE INVENTION

This invention relates to reflective wraps of the kind used to wrap around the ankle, wrist, forehead or other parts of the body of a human or other animal, to identify the presence of such human or animal at night.

BACKGROUND OF THE INVENTION

It is well known to use highly reflective material attached to animal collars or leashes, in order to identify the presence of such animals for safety. Such devices are disclosed in U.S. Pat. Nos. 4,407,233 (collar for pet); 4,409,189 (collar for pet); 4,384,548 (dog leash).

It is also well known to use reflective materials attached to joggers, to identify their presence, as shown by U.S. Pat. No. 4,268,917 (reflective vest for jogger); and U.S. Pat. No. 4,312,567 (reflective device clipped onto a jogger). It is also well known to use ankle wraps to support the ankles of animals such as horses, as shown by U.S. Pat. No. 3,338,028. Ankle-wraps for joggers for carrying weights are also well known, as shown in U.S. Pat. No. 4,838,546.

However, there is a need for a reflective wrap that combines the comfort and support of a fabric wrap against the skin of the user, with a reflective outer material attached to the surface of the fabric. Further, there is a need for such a device wherein the attachment seam of the fabric and reflective material is not exposed but is hidden from view, in order to avoid external contact against such seam by other moving limbs of the user, thus providing improved comfort and wrap durability.

SUMMARY OF THE INVENTION

The reflective wrap of this invention satisfies the needs of the prior art by providing a reflective wrap utilizing an elongated strip of elastic fabric for contacting the skin of the user of the wrap. Superimposed on the fabric is an elongated strip of reflective material. The reflective material is substantially the same size and shape as the elastic fabric. A blind stitch joins the fabric and reflective material along two lengthwise edges thereof, with the stitches and rough edges of the fabric and reflective material not exposed, but hidden in a position between the fabric and reflective material. A velcro fastening device fastens the wrap around the limb of a user. An alternative embodiment includes a further elongated strip of elastic fabric at one end of the wrap, for using the wrap as an ankle wrap for a horse. Another embodiment includes a spring clip at each end of the wrap, in place of the Velcro device, for using the wrap as a nose band over the nose of a horse, with the clips fastened to the horse's bridle.

The method of producing the blind stitch includes the steps of, first, superimposing the reflective material over the elastic fabric with the reflective surface down, in contact with the fabric; second, stitching the fabric and reflective material together by conventional stitching, to form an elongated hollow tube of fabric and reflective material; third, reversing the elongated tube inside-out, to expose the reflective surface and position the stitching within the tubing. Finally, connecting Velcro, or other types of fasteners to each end of the wrap.

BRIEF DESCRIPTION OF THE DRAWINGS

FIG. 1 is a front view of the wrap of this invention, showing the reflective material overlapped along its length by soft fabric backing.

FIG. 2 is a back view of the wrap shown in FIG. 1.

FIG. 3 is a view of an edge of the wrap.

FIG. 4 is a section along 3—3 of FIG. 1, showing the blind stitching means for fastening the fabric and reflective material.

FIG. 5 is a perspective view of a portion of the wrap during fabrication, showing the fabric and reflective material superimposed and joined by stitches.

FIG. 6 is an alternate embodiment drawing the reflective wrap at one end of a longer fabric wrap used to wrap horses' ankles.

FIG. 7 is a cross-sectional view of a leg having the wrap encircling the leg and ready for fastening thereon.

FIG. 8 is an alternate embodiment showing the reflective wrap with clips for fastening to a horse's bridle.

DESCRIPTION OF PREFERRED EMBODIMENT AND BEST MODE

Referring to FIG. 1, there is shown generally the wrap 1 comprising an elastic fabric strip 3, and superimposed thereon a reflective material 5. Strip 3 is elongated with a first end 7 and a second end 9, a top edge 11 and a bottom edge 13. Top edges 11 and 13 are parallel to each other and extend lengthwise between first end 7 and second end 9. Strip 3 has a front surface 15, (see FIG. 4) located behind reflective material 5, and a back surface 17, exposed (as shown in FIG. 4) to contact the skin of the user.

As shown in FIGS. 1 and 2, reflective material 5 is an elongated strip with a first end 19 and a second end 21, a top edge 23 and a bottom edge 25. Top edges 23 and 25 are parallel to each other and extend lengthwise between first end 19 and second end 21. Reflective material strip 5 has a reflective front surface 27 exposed to view (as shown in FIG. 4) and a rear surface 29 contacting the front surface 15 of fabric strip 3. Reflective material 5 and strip 3 are substantially the same elongated shape, and when reflective material 5 is superimposed on fabric 3 reflective material 5 substantially covers fabric 3, with first end 7 of fabric 3 coinciding with first end 19 of reflective material 5, and second end 9 of fabric 3 coinciding with second end 21 of reflective material 5.

As shown in FIGS. 1 and 4, top edge 11 of fabric 3 extends around top edge 23 of reflective material 5 and overlaps front surface 27 of reflective material 5 along top edge 23. In similar fashion, bottom edge 13 of fabric 3 extends around bottom edge 25 of reflective material 5 and overlaps front surface 27 of reflective material 5 along bottom edge 25 of reflective material 5.

Top edges 11 and 23 are joined together by blind stitch means, hereinafter described. Likewise, bottom edges 13 and 25 are also joined together by blind stitch means hereinafter described.

As shown in FIG. 7, back surface 17 of fabric 3 is detachably fastened adjacent its second end 9 in contact with front surface 27 of reflective material 5 adjacent first end 19 thereof. Fastening means 31 can be hook fastener element 33 secured to back surface 17 of fabric 3 adjacent second end 9 thereof, plus pile fastener element 35 secured to front surface 27 of reflective material 5 adjacent first end 19 thereof. Hook fastener element 33 and pile fastener 35 are the type sold under the trademark Velcro, and are generally illustrated in U.S. Pat. No. 2,717,437. Hook fastener element 33 and pile fastener element 35 each extend lengthwise along their respective surfaces toward the opposite end thereof. The length of each element is selected long enough to permit the wrap to be wrapped around a variety of sizes of limbs 37, but permitting sufficient overlap of elements 33 and 35 to provide detachable closure.

As shown in FIG. 4, blind stitch means 39 is used to join reflective material 5 and fabric 3. Both top edge 11 and bottom edge 13 are joined in similar fashion to reflective material 5, and description of one will be the same for both. Top edge 11 overlaps top edge 23 and forms a closed reverse of two layers of fabric, inner layer 41 and outer layer 43. Only inner layer 41 contacts outer surface 27 of reflective material 5. A stitch 45 extends through the thickness of reflective material 5 and only inner layer 41, joining these two layers in a blind stitch which is not exposed to the outside, but remains covered by the outer layer 43. This blind stitch means 39 provides increased comfort to the user because no stitching is exposed to rub against sensitive skin of a user. Only back surface 17 of fabric 3 contacts skin. Also, there are no sharp seams, stitches or other irregularities of edges of fabric 3 and reflective material 5 exposed at the location of joinder of fabric 3 and reflective material 5 to rub against a moving limb such as the other foot or leg of a user, when the wrap is used as an ankle wrap. Thus, blind stitch means 39 provides durability due to avoidance of abrasion of stitch means 39.

FIG. 5 illustrates the method for joining reflective material 5 and fabric 3 into blind stitch means 39. Fabric 3 is positioned with back surface 17 of fabric facing upwardly. Reflective material 5 is superimposed on fabric 3, with reflective front surface 27 facing downwardly and in contact with back surface 17. Fabric 3 and reflective material 5 are stitched together by conventional means, such as by a sewing machine. Stitches 45 extend through the thickness of both fabric 3 and reflective material 5. Stitching 45 extends along both top and bottom edges 11, 13, 23, and 25, respectively, of both fabric 3 and reflective material 5. At this point in the process, the joined materials form an elongated tube 47, open at both ends 7, 19 and 9, 21, respectively. The rear surface 29 of reflective material 5 forms the exposed top surface of the tube, and the front surface 15 of the strip 3 forms the exposed bottom surface of the tube 47. Stitches 45 are exposed, i.e, not blind stitches. In order to produce blind stitches, tube 47 is now reversed, or turned inside out, by drawing one end 7,19 through the interior opening 49 of tube 47. This reversal of tube 47 positions rear surface 29 of reflective material against front surface 15 of fabric 3, as hereinabove described, and moves stitches 45 into the interior of tube 47, forming a blind stitch.

FIG. 6 shows an alternative embodiment wherein the wrap 1 is positioned at one end of an elongated strip of fabric 51, when the invention is to be used to wrap the ankle of a horse. The structure and fabrication of wrap 1 is the same as hereinabove described, but one end of the fabric 3 has connected thereto the elongated strip of elastic fabric 51 which is first wrapped around the horse's leg 37. The reflective wrap 1 is positioned last around the leg, and fastened as shown in FIG. 7.

FIG. 8 shows an alternative embodiment of the wrap 53 having a suitable spring clip 55, 57 fastened to each end of the wrap 53 for connecting to a horse's bridle (not shown). Wrap 53 extends around a horse's nose, with fabric 3 contacting the horse, and reflective material 5 exposed to reflect light so as to identify the presence of the horse.

Although it is preferred to use blind stitching 37 for the joinder of fabric 3 and reflective material 5, it would be equivalent to use other means such as adhesive, or thermally activated adhesive. Such adhesives would be spread along top and bottom edges 11, 13, 23, and 25 of fabric 3 and reflective material 5, between inner layer 41 of fabric 3 and outer surface 27 of reflective material 5, in place of stitches 45. Such adhesive joinder is also herein referred to as a "blind stitch". Fabric 3 is preferred to be of soft, flexible and elastic material, for comfort and to permit fabric 3 to overlap edges 23 and 25 of reflective material 5 as herein above described. Reflective material 5 should be highly light reflective fluorescent or phosphorescent, of any commercial type available. I have successfully used materials sold by 3M Corporation under the trademark Scotchlite Fabrics, Numbers 8910, 8930, 8960, 8986, and 8987.

Also, it would be acceptable to use a sheet material of the types disclosed in U.S. Pat. No. 2,567,233 of any suitable color.

The overall length of wrap 1 should be selected based upon the intended use of the wrap. When wrap 2 is intended to be used as an ankle wrap of a jogger, the length of wrap should be between 10 and 18 inches, so as to fit a variety of sizes of limbs. For a horse ankle wrap, the length of added extra wrap 51 should be 72 to 84 inches. For a horse's noseband, the wrap should be between 5 and 12 inches in length. For the wristband of a jogger, the wrap should be about 6 to 8 inches in length. For a jogger's headband, the wrap should be about 12 to 26 inches in length.

I claim:

1. A reflective wrap comprising:
    a. an elongated strip of elastic fabric having a first and second end, a top edge and bottom edge extending lengthwise between said first and second ends, said top and bottom edges being parallel, and a front and back surface;
    b. an elongated strip of reflective material having a first and second end, a top edge and bottom edge extending lengthwise between said first and second ends, said top and bottom edge being parallel, a back surface and a light reflective front surface, said strip of reflective material being substantially the same shape as said strip of fabric, and superimposed thereon, with said first and second ends, respectively, of said fabric coinciding with said first and second ends, respectively, of said reflective material;
    c. said back surface of said reflective material contacting said front surface of said fabric, and substantially covering it;
    d. blind stitch means along the length of said top and bottom edges of said fabric and said reflective material for joining together said fabric and said reflective material, said blind stitch means being unexposed; and
    e. means for detachably fastening said back surface of said fabric adjacent its first end in contact with said front surface of said reflective material adjacent its second end.

2. a reflective wrap of claim 1 wherein said blind stitch means comprises:

a. said top edge of said fabric extending around said top edge of said reflective material and overlapping said front surface of said reflective material at said top edge thereof in two layers of fabric, said two layers having only an inner layer in contact with said front surface of said reflective material;

b. a plurality of fastener stitches along the length of said top edge of said elongated strip, each stitch extending through only said reflective material and said inner layer of fabric;

c. said bottom edge of said fabric extending around said bottom edge of said reflective material and overlapping said front surface of said reflective material at said bottom edge thereof in two layers of fabric, said two layers having only an inner layer in contact with said front surface of said reflective material; and d. a plurality of fastener stitches along the length of said bottom edge of said elongated strip, each stitch extending through only said reflective material and said inner layer of fabric.

3. A reflective wrap of claim 2 having a further elongated strip of elastic fabric joined at, and extending from, said fabric at said first end.

4. A reflective wrap comprising:

a. an elongated strip of elastic fabric having a first and second end, a top edge and bottom edge extending lengthwise between said first and second ends, said top and bottom edges being parallel, and a front and back surface;

b. an elongated strip of reflective material having a first and second end, a top edge and bottom edge extending lengthwise between said first and second ends, said top and bottom edges being parallel, a back surface and a light reflective front surface, said strip of reflective material being substantially the same shape as said strip of fabric, and superimposed thereon, with said first and second ends, respectively, of said fabric coinciding with said first and second ends, respectively, of said reflective material;

c. said back surface of said reflective material contacting said front surface of said fabric, and substantially covering it;

d. blind stitch means along the length of said top and bottom edges of said fabric and said reflective material for joining together said fabric and said reflective material, said blind stitch means being unexposed; and e. clip means attached to said first and second ends of said fabric and reflective material for detachably fastening said wrap to a bridle of a horse.

5. A reflective wrap comprising:

a. an elongated strip of elastic fabric having a first and second end, a top edge and bottom edge extending lengthwise between said first and second ends, said top and bottom edges being parallel, and a front and back surface;

b. an elongated strip of reflective material having a first and second end, a top edge and bottom edge extending lengthwise between said first and second ends, said top and bottom edges being parallel, a back surface and a light reflective front surface, said strip of reflective material being substantially the same shape as said strip of fabric, and superimposed thereon, with said first and second ends, respectively, of said fabric coinciding with said first and second ends, respectively, of said reflective material;

c. said block surface of said reflective material contacting said front surface of said fabric, and substantially covering it;

d. said top edge of said fabric extending around said top edge of said reflective material and overlapping said front surface of said reflective material at said top edge thereof in two layers of fabric, said two layers having only an inner layer in contact with said front surface of said reflective material;

e. a plurality of fastener stitches along the length of said top edge of said elongated strip, each stitch being unexposed by extending through only said reflective material and said inner layer of fabric;

f. said bottom edge of said fabric extending around said bottom edge of said reflective material and overlapping said front surface of said reflective material at said bottom edge thereof in two layers of fabric, said two layers having only an inner layer in contact with said front surface of said reflective material;

g. a plurality of fastener stitches along the length of said bottom edge of said elongated strip, each stitch being unexposed by extending through only said reflective material and said inner layer of fabric; and h. means for detachably fastening said back surface of said fabric adjacent its first end in contact with said front surface of said reflective material adjacent its second end.

* * * * *